US005542069A

United States Patent [19]
Meppelink et al.

[11] Patent Number: 5,542,069
[45] Date of Patent: Jul. 30, 1996

[54] METHOD AND APPARATUS FOR SIMULATING INPUT EVENTS IN A WINDOWED ENVIRONMENT

[75] Inventors: David J. Meppelink, Chelmsford, Mass.; Sunita Mani, Palo Alto, Calif.

[73] Assignee: Sun Microsystems, Inc., Mountain View, Calif.

[21] Appl. No.: 205,587

[22] Filed: Mar. 2, 1994

[51] Int. Cl.$^6$ .............................. G06F 3/00; G06F 9/455
[52] U.S. Cl. .................... 395/500; 395/157; 395/159; 395/161; 364/188; 364/578; 345/119; 345/146
[58] Field of Search .................................. 395/500, 700, 395/157, 159, 160, 161, 600, 575; 364/578, 188, 189; 345/119, 121, 127, 145, 146

[56] References Cited

U.S. PATENT DOCUMENTS

| 4,903,218 | 2/1990 | Longo et al. | 364/521 |
|---|---|---|---|
| 5,036,315 | 7/1991 | Gurley | 340/721 |
| 5,113,517 | 5/1992 | Beard et al. | 364/200 |
| 5,157,384 | 10/1992 | Greanias et al. | 340/706 |
| 5,305,435 | 4/1994 | Bronson | 395/159 |
| 5,339,261 | 8/1994 | Adelson et al. | 364/570 |
| 5,408,602 | 4/1995 | Giokas et al. | 395/157 |
| 5,408,665 | 4/1995 | Fitzgerald | 395/700 |

*Primary Examiner*—Kevin J. Teska
*Assistant Examiner*—Tan Q. Nguyen
*Attorney, Agent, or Firm*—Blakely Sokoloff Taylor & Zafman

[57] ABSTRACT

An input device emulator comprises an interpreter and a router is provided to a windowed environment. The interpreter reads and interprets commands of a first application program and generates simulated input device messages. The router routes the simulated input device messages to a window sever, which in turn translates the simulated input device messages into simulated input events and forwards them to a second application program. Additionally, the router also routes real input and output device messages between the I/O devices and the window server. At initialization, instances of the router are pushed onto appropriate locations in the various input/output streams of the operating system. Thus, input events are simulated with increased reliability, and without requiring modification to the window server.

20 Claims, 10 Drawing Sheets

```
struct msg { int    emul short  cmd int    val₁ int    val₂

};
```
⎯⎯⎯⎯⎯⎯⎯⎯⎯⎯⎯⎯⎯⎯⎯⎯⎯⎯⎯⎯⎯⎯⎯⎯⎯⎯ 68

```
if ( size of (message) == size of (struct msg)

&& message.emul == EMUL ) { sim_message = make_message (message)

qreply (sim_message) ;

} else { putnext (message) ;

| SIMULATED INPUT EVENTS | CMD | VAL1 | VAL2 |
|---|---|---|---|
| Keystation Up Event | KBUP | Keystation Value | N/A |
| Keystation Down Event | KBDOWN | Keystation Value | N/A |
| Mouse Movement Event | MSDELTA | X delta | Y delta |
| Mouse Button Down Event | MSDOWN | MSLEFT, MSRIGHT or MSMIDDLE | N/A |
| Mouse Button Up Event | MSUP | MSLEFT, MSRIGHT or MSMIDDLE | N/A |

(x0, y0) WINDOW SERVER (rx, ry) APPL. PGM (x1 = x0 + rx, y1 = y0 + ry) IDE

METHOD AND APPARATUS FOR SIMULATING INPUT EVENTS IN A WINDOWED ENVIRONMENT

BACKGROUND OF THE INVENTION

1. Field of the Invention

The present invention relates to the field of computer systems. More specifically, the present invention relates to the simulation of input events in a windowed environment.

2. Background

Today, many computer systems utilize direct manipulation graphical user interfaces in which many previously coded programming commands are replaced by graphic images, or icons, on a computer display. These graphic images, or icons, symbolically represent a variety of objects or operations the computer system will execute if the graphic images, or icons, are chosen. A user interacts with the computer by choosing and manipulating these graphic images, or icons, using keyboard and cursor control devices such as a "mouse" or a track ball.

Additionally, many direct manipulation graphical user interfaces utilize multiple windows displayed on the computer display for the applications to convey information to a user. The information is presented in a combination of text and graphics in these windows. Each window may take the form of a variety of objects such as a file folder, loose-leaf binder, or simple rectangle, and the windows may overlap one another with the "top" window fully visible and constituting the current "work file". The user may delete information from a window, move data from one window to another, and generally operate on the window as if an actual file in an office is being used. Thus, the user is permitted to operate on and manipulate the window contents, and the window itself, as if the image constituted an actual object.

For further description of specific implementations of direct manipulation graphical user interfaces, for example, OpenWindows™, by SUN Microsystems, Inc., or others by manufacturers such as International Business Machines, and Apple Computer, Inc., and their window subsystems, the reader is directed to technical literature provided by these companies.

Windowed applications with graphical user interfaces tend to be large and complex, requiring a large amount of testing. This testing can be time consuming as it involves many possible combinations of actions and many possible situations. Most of this work is redundant and error-prone when performed by humans. These problems are typically avoided by creating automated tests. There are two basic approaches for writing automated tests, a capture/replay approach, and a programmatic approach. Most tools use a combination of both approaches. The capture/replay approach requires the tester to do a series of actions while the test tool records the actions. The sequence can then be played back to reproduce the user actions. The resulting tests are typically very hard to edit because they are simply lists of actions with no structure. The resulting tests also cannot respond to what is happening on the screen when the test is replayed. Thus, the capture/replay approach is only suitable for the very simple test cases. Under the programmatic approach, the tester writes a script or a program that describes the actions to be taken by an emulator. A journaling interface to the window server is provided to simulate user actions. The programmatic approach allows the resulting tests to respond to what is happening on the screen provided that the appropriate dynamic decision makings are supported by the emulator of user actions. As a result, the programmatic approach tends to be more powerful than the capture/replay approach.

However, because of the tight coupling between the prior art journaling interface to the window server, the prior art journaling interface tends to be unreliable, especially for development versions of the window subsystem. Under the prior art approach, the journaling interface also tends to change for different releases of the window server, requiring changes to the automation tool. An alternative approach is to use standard extensions to the window server. However, this alternative approach has the disadvantage of causing the testing platform to be fundamentally different from the operational platform.

Thus, it is desirable to be able to simulate user actions in a windowed environment in a reliable manner. Additionally, it is further desirable that the user input emulator be able to support dynamic decision makings. As will be disclosed, the present invention provides for such a method and apparatus that advantageously achieves the desired results.

SUMMARY OF THE INVENTION

Under the present invention, the desired results are advantageously achieved by providing an input device emulator comprising an interpreter and a router. The interpreter reads and interprets commands of a first application program, such as testing commands of a test script program, and generates simulated input device messages. The router routes the simulated input device messages to a window server. Additionally, the router also routes real input and output (I/O) device messages between the I/O devices and the window server. At initialization, instances of the router are pushed onto the operating system's various input/output device streams, in front of the window server from an upstream perspective, connecting the interpreter and the I/O devices to the window server. As a result, the input device emulator of the present invention is not tightly coupled to the window server, thereby improving its reliability, and requiring no modification to the window server.

Under the presently preferred embodiment, the input device emulator of the present invention also supports a number of dynamic decision makings by making appropriate queries and requests to the window server, including opening a window if the targeted window of a command is not open, and relocating a window if the targeted window of a command is only partially visible on the screen.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 1:
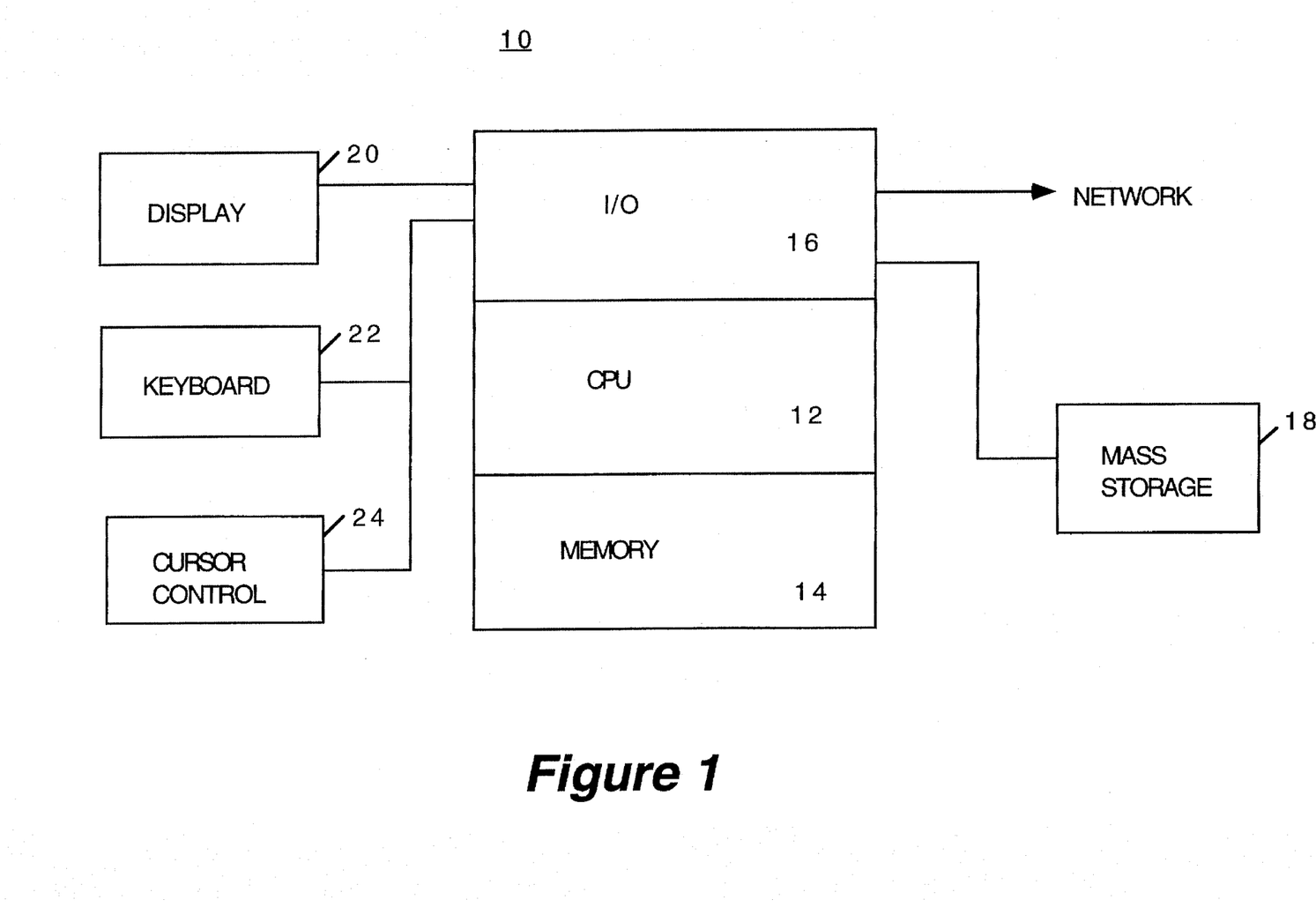
FIG. 1 illustrates an exemplary computer system incorporating the teachings of the present invention.

Referring now to FIG. 1, a block diagram illustrating an exemplary computer system incorporating the teachings of the present invention is shown. The exemplary computer system 10 comprises a central processing unit (CPU) 12, a memory unit 14, and input/output (I/O) circuitry 16 connected to each other as shown. Additionally, the system 10 further comprises mass storage 18, a display unit 20, a keyboard 22, and a cursor control device 24 coupled to the I/O circuitry 16. Except for the teachings of the present invention as incorporated, these elements 12–24 are intended to represent a broad category of CPUs, memory units, etc., found in many computer systems. They are well known in the art and will not be further described.

Figure 2:
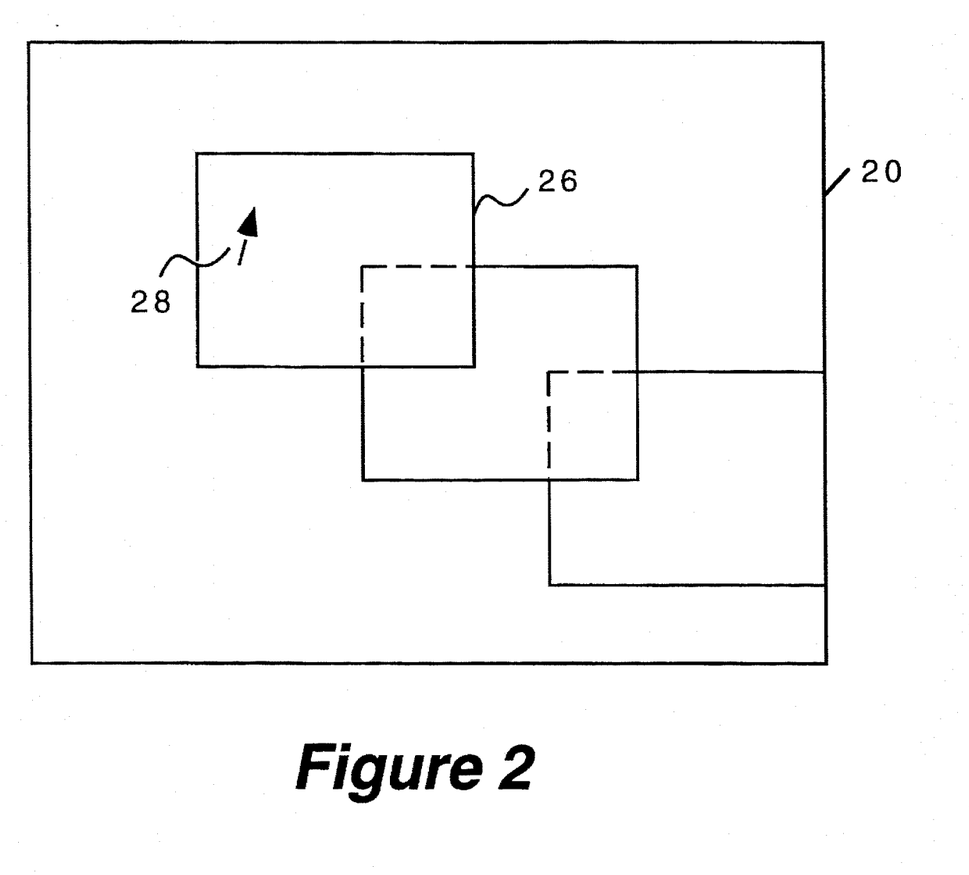
FIG. 2 illustrates the display of FIG. 1 in further detail.

Referring now to FIG. 2, a block diagram illustrating the display of FIG. 1 in further detail is shown. The display 20 comprises a number of windows 26 for conveying information from the applications to the user and receiving inputs from the user. The user moves from one window to another by positioning the cursor 28 using a cursor control device 24. Inputs are provided to the owner application of the current window 26 by selecting menu items displayed in the window using the cursor control device 24 or by entering them using a keyboard 22. As will be described in more detail below, an input device emulator is provided to facilitate simulation of these keyboard and cursor control device input events for the application programs. The windowed environment is intended to represent a broad category of window environments found in many computer systems. They are well known in the art and will not be further described.

Figure 3:
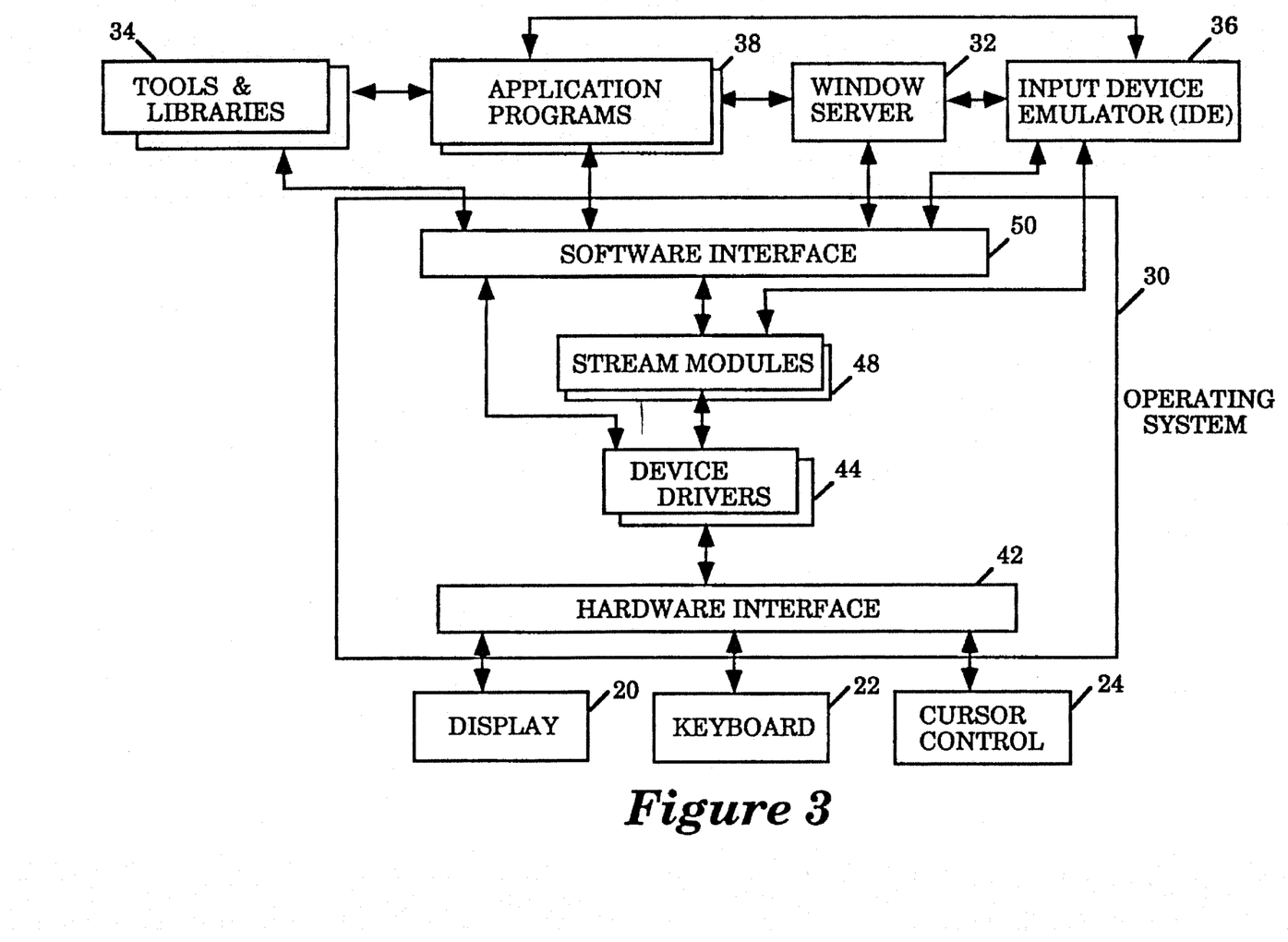
FIG. 3 illustrates the key software elements of the exemplary computer system of FIG. 1, including the input device emulator of the present invention.

Referring now to FIG. 3, a block diagram of the key software components of the exemplary computer system of FIG. 1 in further detail is shown. Shown is an operating system 30, a window server 32, a collection of tools and libraries 34, the input device emulator of the present invention 36, and a number of application programs 38, architecturally related to each other as shown.

The operating system 30 provides system services such as memory management, input/output services to the window server 32, the input device emulator 36, etc. The operating system 30 comprises a hardware interface 42 for accessing the various I/O devices, including the display 20, the keyboard 22, and the cursor control device 24. The operating system 30 also comprises a number of device drivers 44 for controlling these accesses. Additionally, the operating system 30 comprises a number of stream modules 48 for performing stream I/O accesses. As will be explained in more detail below, with the exception of the input device emulator 36, in general, these services are available to the window server 32, the input device emulator 34, etc. through the software interface 50.

The window server 32 provides window services such as I/O device resource control, and translation of I/O device messages into I/O event for the input device emulator 36, the application programs 38, etc. The tools and libraries 34 provide common application services such as event notifications to the application programs 38. The input device emulator 36 of the present invention generates and provides simulated input device messages to the window server 32. The input device emulator 36 also routes real I/O device messages between the I/O devices 20–24 and the window server 32.

Except for the input device emulator 36 of the present invention and the manner in which the other elements 30–34 and 38 cooperate with the input device emulator 36, the other elements 30–34 and 38–40 are intended to represent a broad category of operating systems, window servers, etc., found in many computer systems. They are well known in the art, and will not be otherwise further described.

Figure 4:
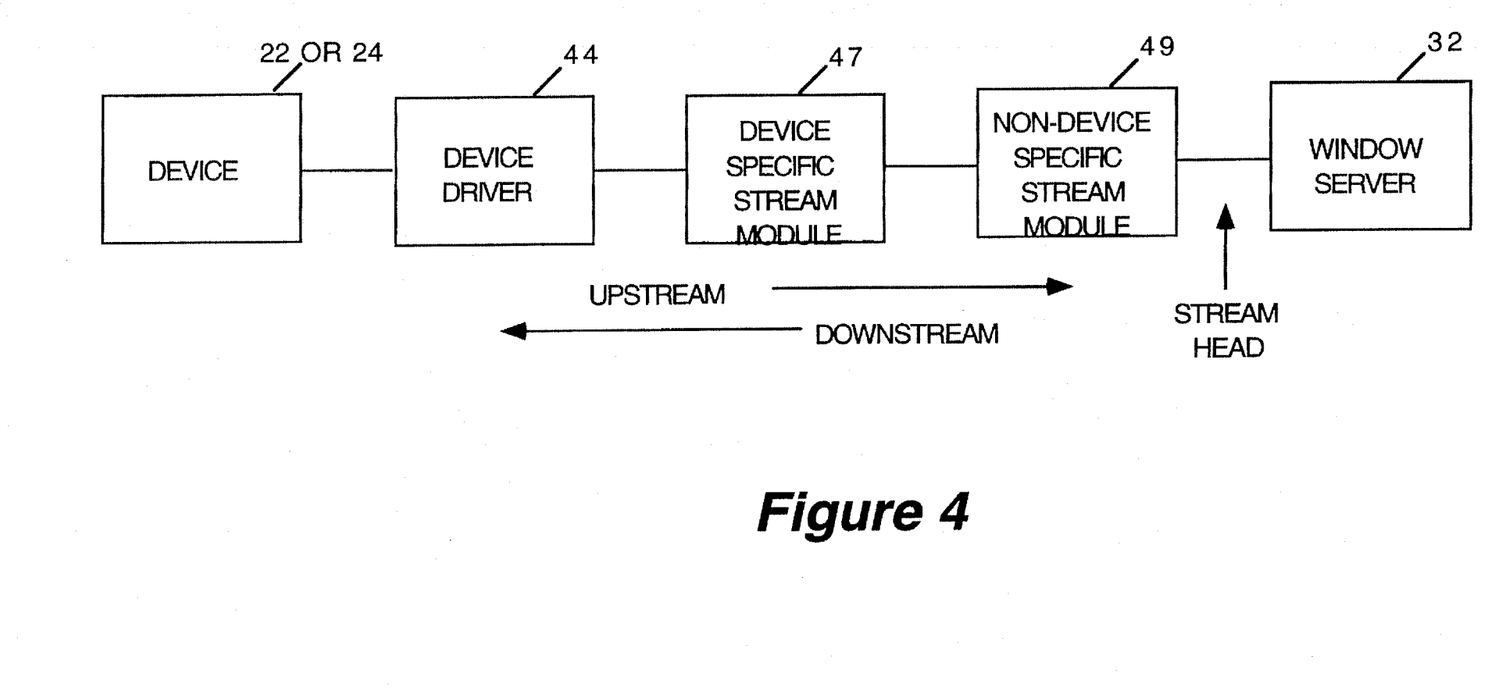
FIG. 4 illustrates a generic I/O stream of the operating system connecting an I/O device to a process.

Referring now to FIG. 4, a block diagram illustrating a generic I/O stream is shown. An I/O stream is a fully-duplex connection between a process 32–38 and an I/O device, such as the keyboard 22 and the cursor control device 24. The I/O stream consists of a set of linearly linked device specific and non-device specific modules 47 and 49. Each linked module 44, 47, etc. has a read "channel" and a write "channel". When a process 32–38 writes data, the write "channel" of each linked module 44, 47, etc. sends the data downstream to a receiving device 22 or 24. When a device 22 or 24 inputs data, the read "channel" of each linked module 44, 47 sends the data upstream to a reading process 32–38. A particular example of an operating system having such an I/O stream is the UNIX® system, which is well known in the art. (UNIX is a registered trademark of the UNIX System Laboratory.)

Figure 5:
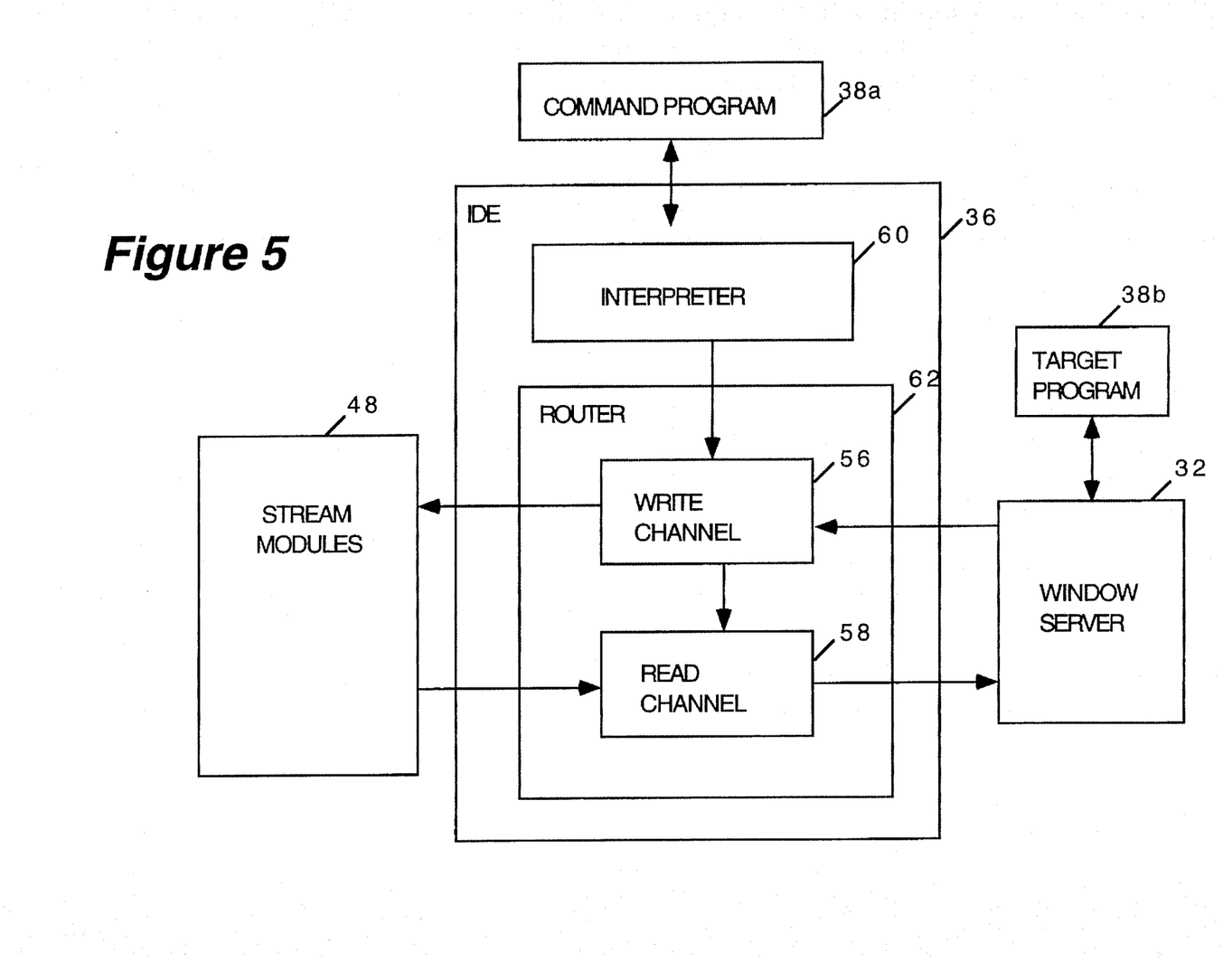
FIG. 5 illustrates the input device emulator of the present invention in further detail, including its relationship to the stream modules, the application programs, and the window server.

Referring now to FIG. 5, a block diagram illustrating the input device emulator of the present invention in further detail is shown. As illustrated, the input device emulator 36 comprises an interpreter 60 and a router 62. The interpreter 60 reads and interprets commands of an application program 38a, such as testing commands of a test script program, and generates simulated input device messages. In the presently preferred embodiment, the interpreter 60 also supports a number of dynamic decision makings. The router 62 routes the simulated input device messages to the window server 32. Additionally, the router 62 also routes real I/O device messages between the stream modules 48 and the window server 32.

The interpreter 60 generates the simulated input device messages in accordance with a format expected by the router 62, which will be described in further detail below. The dynamic decision makings supported by the interpreter 60 will also be described in further detail below. Otherwise, the interpreter 60 may offer any number of application dependent interpretation functions to programs. Since interpreter technology is well known in the art, the interpreter 60 will not be otherwise further described.

The router 62 comprises a write "channel" 56, and a read "channel" 58. The write "channel" 56 receives the simulated input device messages from the interpreter 60, and real output device messages from the window server 32. The simulated input device messages received from the interpreter 60 are redirected to the read "channel" 58, whereas, the real output device messages received from the window server 32 are passed to the stream modules 48. The read "channel" 58 receives simulated input device messages redirected from the write "channel" 56, and real input device messages from the stream modules 48. In either case, the simulated input device messages received from the write "channel" 56 as well as the real input device messages received from the stream modules 48 are passed to the window server 32, and in due course to the targeted application program 38b.

Figure 6:
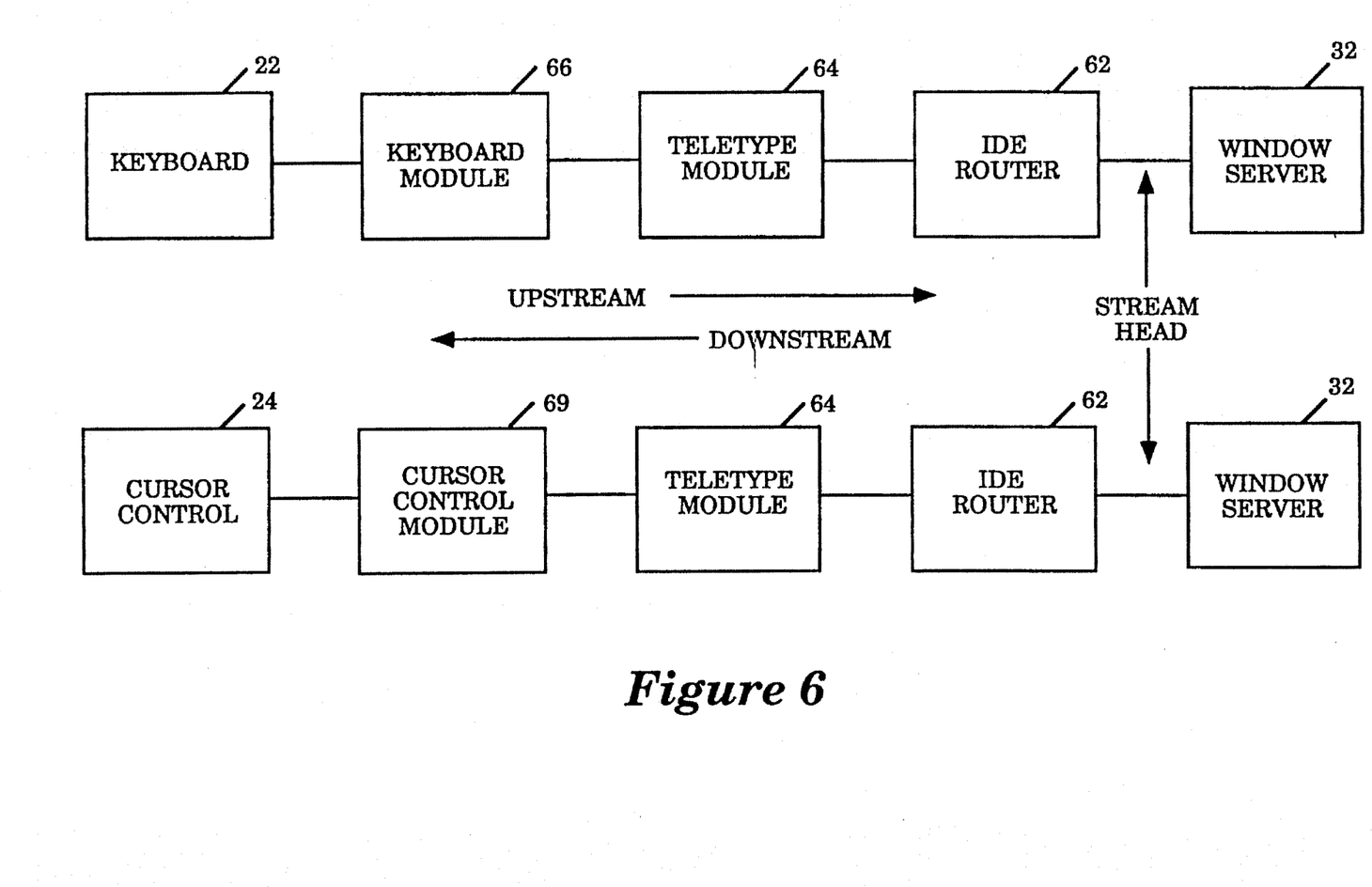
FIG. 6 illustrates the position of the router of the input device emulator of the present invention on the I/O stream connecting the window server to the keyboard as well as the cursor control device.

Referring now to FIG. 6, two block diagrams illustrating the keyboard and the cursor control I/O streams in further detail are shown. As illustrated, at initialization, an instance of the router 62 is pushed onto each of the keyboard and cursor control I/O streams in front of the window server 32 from the upstream perspective, but behind the keyboard/cursor control module 65 and 66 and the teletype module 64. At termination, both instances of the router 62 are popped from the respective I/O streams. As a result, the program 38a being interpreted can cause simulated input events to be provided to the targeted application program 38b through the window server 32 in a transparent manner. As far as the target application program 38 and the window server 32 are concerned, the simulated input events and the simulated input device messages are indistinguishable from the real input events and the real input device messages respectively. Neither the window server 32, nor any of the input/output devices 22–24 are aware of the interposing of the router 62 of the input device emulator 36 of the present invention between them. More importantly, the simulated input events are provided to the window server 32 without requiring of a journaling interface that is tightly coupled to the window server 32, thereby improving the reliability of the input device emulator 36, and without requiring modification to the window server 32.

Figure 7:
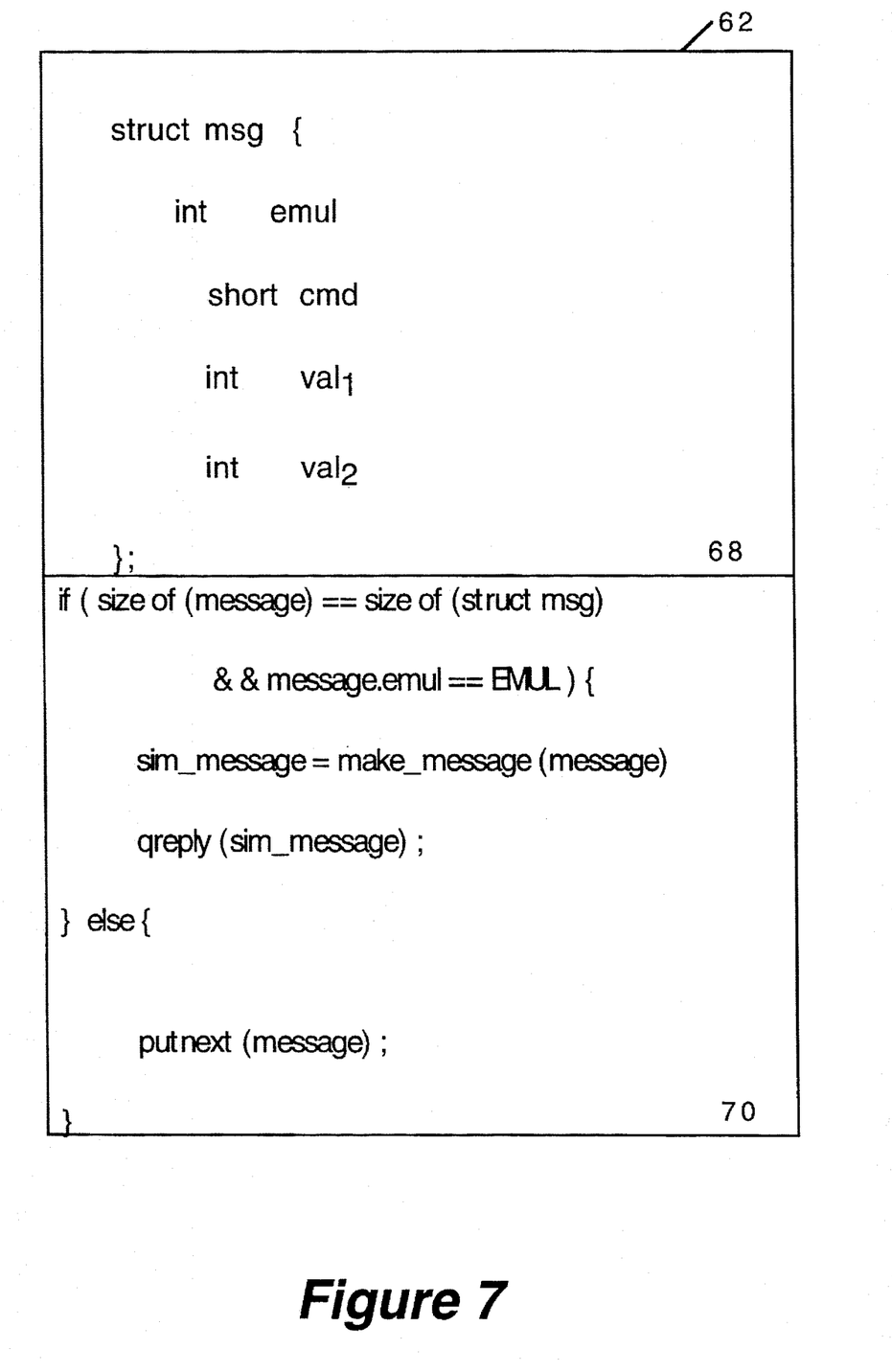
FIG. 7 illustrates the data format for the write "channel" and the operation logic of the router of the present invention.

Referring now to FIG. 7, a block diagram illustrating the data format of the write "channel" and the operational logic of the router of the input device emulator of the present invention is shown. As illustrated by the "msg" data structure 68, the write "channel" of the router 62 expects a simulated input event to be presented as a message having a predetermined value (also known as magic number in the art) for the variable "emul" denoting the message to be a simulated input event. The predetermined value is to be followed by a command code, a first, and a second command value, which will be described in further detail below.

As illustrated by the code segment 70, for each message the router 62 receives, the router 62 checks to determine if the message size of the message received equals the expected size of a message for a simulated input event. Additionally, the router 62 checks to determine if the starting value for the variable "emul" equals the predetermined value. If both conditions are met, the message is a simulated input message. The message is then redirected to the read "channel" to be forwarded upstream to the window server 32 (qreply (sim_message)"), and then to the targeted application program 38b. If at least one of the two conditions is not met, the message is a real output device message. The message is then forwarded downstream to the device driver modules 44 (putnext(message)"), and then to the device 22 or 24.

Figure 8:
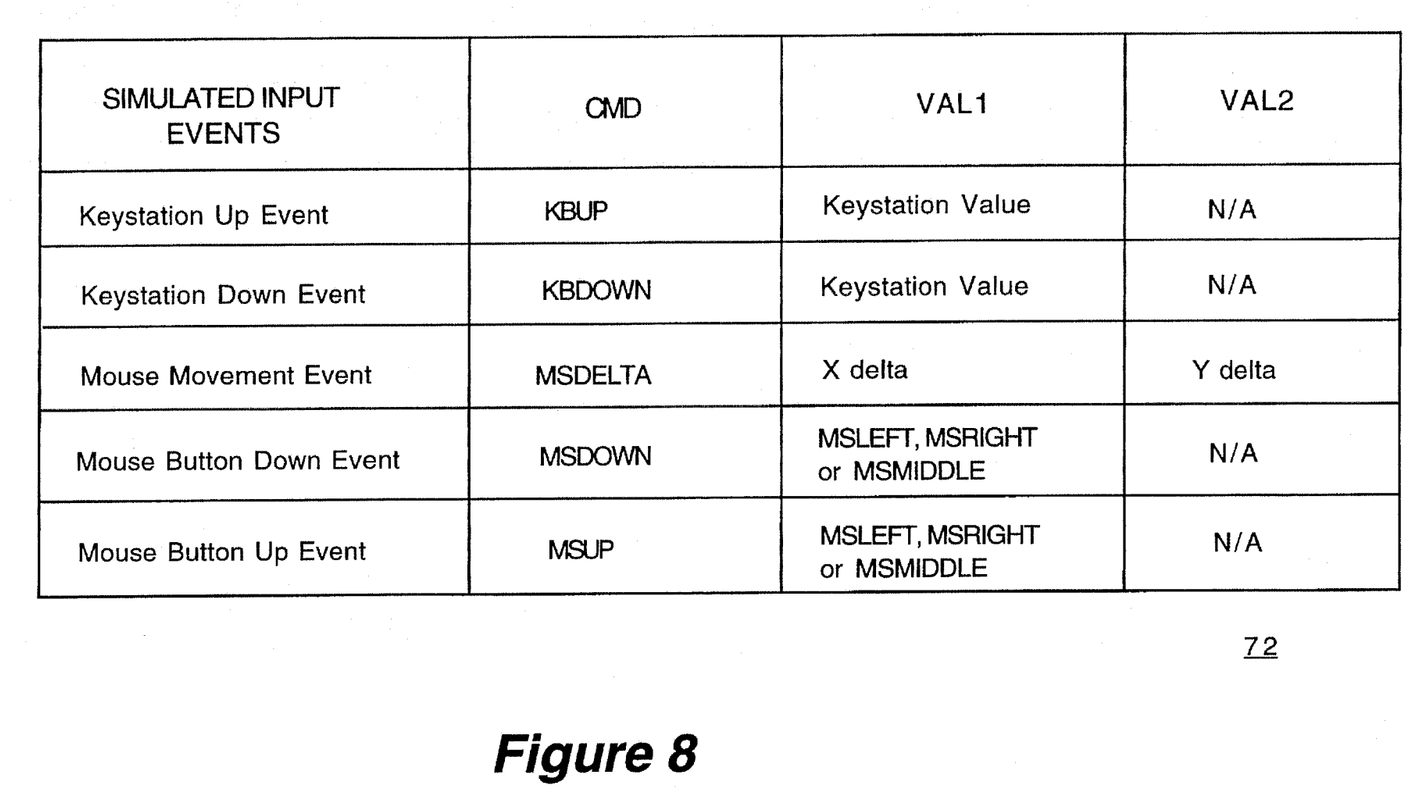
FIG. 8 illustrates a number of exemplary command code and values for simulating a number of input events.

Referring now to FIG. 8, a block diagram illustrating a number of exemplary command codes and values for simulating a number of input events is shown. The input events illustrated include a "keystation up event", a "keystation down event", a "mouse movement event", a "mouse button down event", and a "mouse button up event". A key station is a unique numeric identifier for each key on the keyboard. The first command value represents either a keystation value, an amount of change in the x-direction, or a button identifier for the mouse. The second command value is normally not used, except when simulating a mouse movement event. In that case, the second command value represents the amount of change in the y-direction.

Figure 9A:
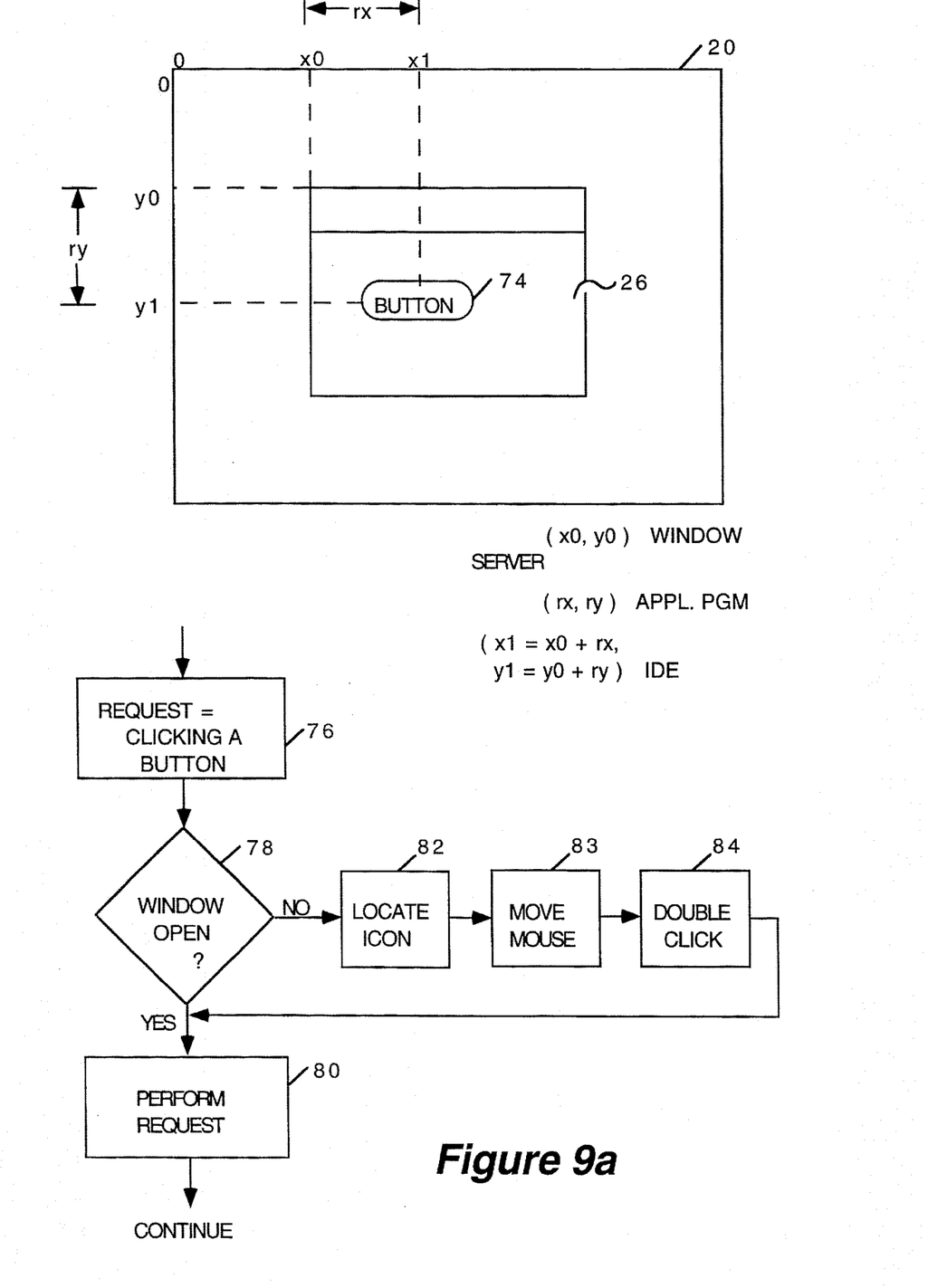
FIGS. 9a–9b illustrates exemplary additional dynamic decision makings supported by the input device emulator of the present invention.
Figure 9B:
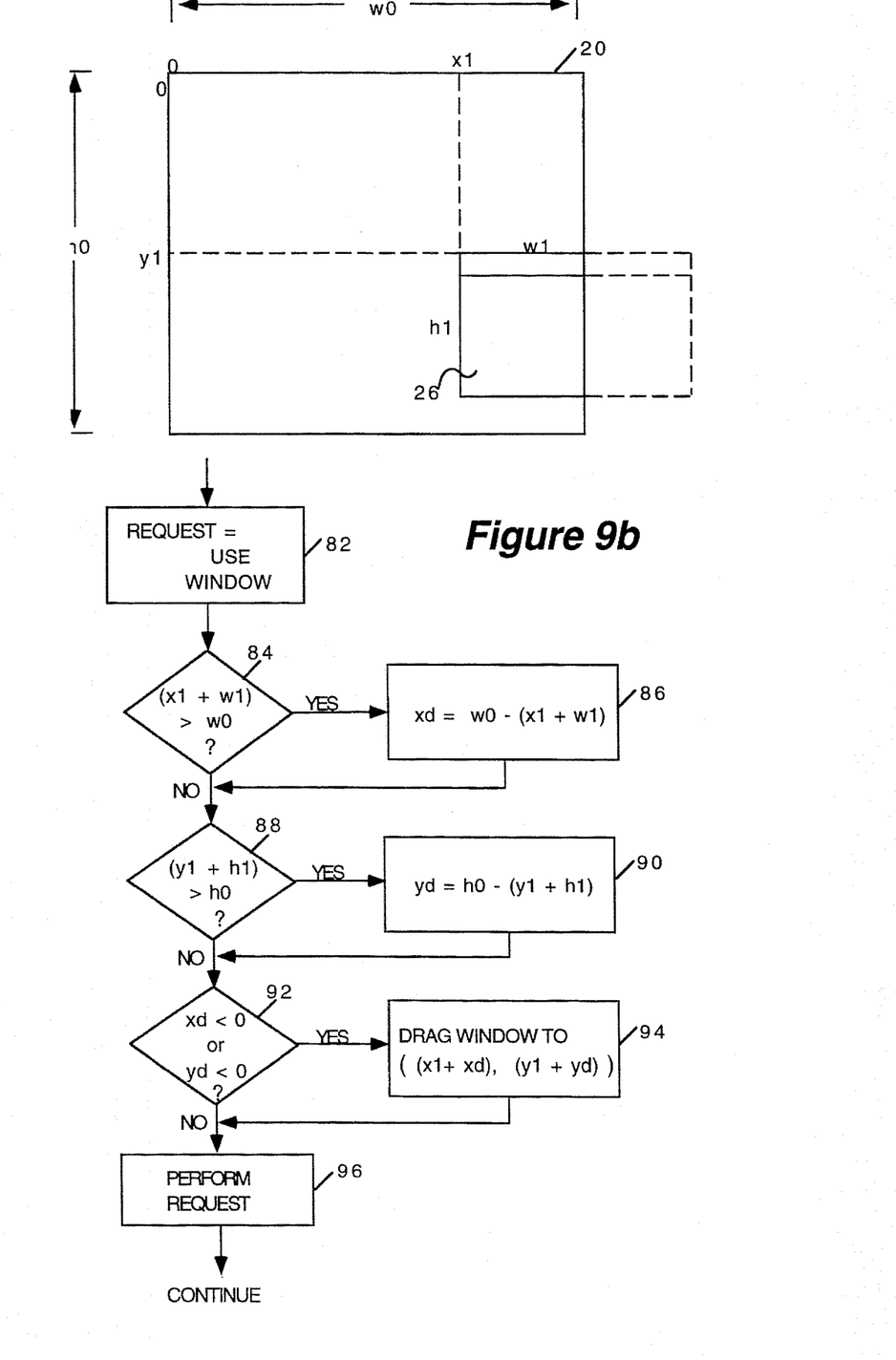

Referring now to FIGS. 9a–9b, two block diagrams illustrating two exemplary dynamic decision makings supported by the input device emulator of the present invention are shown. FIG. 9a illustrates the support for opening a window if the targeted window of a request is not open. FIG. 9b illustrates the support for relocating a window if the targeted window of a request is partially off screen.

As illustrated in FIG. 9a, if the input event to be simulated is a mouse button clicking event on a menu button of a window 26, step 76, the interpreter 60 determines whether the target window 26 of the mouse button clicking event is open, step 78. The interpreter 60 makes the determination by querying the window server 32. If the targeted window 26 is not open, the interpreter 60 first locates the icon, block 82, and then simulates a mouse move, step 83, and then a mouse button double click event, step 84, to open the window 26. The interpreter 60 also locates the icon by querying the window server 32.

Upon ascertaining that the target window 26 of the simulated mouse button clicking event is open, the interpreter 60 generates the simulated mouse button clicking event, step 80. The location of the simulated mouse button clicking event is computed based on offset coordinates (rx, ry) of the menu button provided by the application program 38 being executed by the interpreter, and the base coordinates (x0, y0) of the target window 26 provided by the window server 32.

As illustrated in FIG. 9b, if the command involves using a window 26, the interpreter 60 determines if the target window 26 is partially off screen 20 by checking whether the sums of the base coordinates (x0, y0) and the dimensions (w1, h1) of the target window 26 exceed the dimensions (w0, h0) of the screen 20, steps 84 and 88. In each case, if the sum is greater than the corresponding dimension of the screen 20, i.e. (x1+w1)>w0 or (y1+h1)>h0, a delta movement amount (xd or yd) is computed, i.e. xd=w0−(x1+w1) or yd=h0 −(y1 +h1), step 86 or 90. The interpreter 60 obtains (x0, y0), (w0, h0), and (w1, h1) from the window server 32.

Upon making these checking and conditionally computing the delta movement amounts (xd, yd), the interpreter 60 checks to determine if either xd or yd is less than zero, step 92. If either xd or yd is less than zero, the interpreter 60 first generates a simulated mouse movement event to drag the target window 26 to the new base coordinates ((x1+xd), (y1+yd)). Upon ascertaining that the target window 26 is not partially off screen 20, the interpreter 60 then proceeds to perform the use request, generating the necessary simulated input events, step 96.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative of, and not limiting the scope of the present invention.

What is claimed is:

1. In a computer system comprising an input device, an apparatus for simulating input events from the input device as if the simulated input events are real input events generated by the input device, said apparatus comprising:

(a) an interpreter responsive to commands of a first executing program of the computer system for generating simulated input device messages from the input device as if the simulated input device messages are real input device messages generated by the input device; and (b) a router cooperative with said interpreter and interposed between a window server of said computer system and said input device in an input/output stream of said computer system connecting said window server to said input device for routing upstream the generated simulated input device messages to said window server which in turn would translate the simulated input device messages into simulated input device events and continue to forward upstream the simulated input device events to a second executing program of said computer system, said router being also used to handle upstream routing to and downstream routing from said window server for non-simulated real input/output device messages being exchanged between said input device and executing programs of said computer system.

2. The apparatus as set forth in claim 1, wherein said router comprises:

(b.1) a write channel for rerouting said simulated input device messages from said interpreter to a read channel of said router, and routing said non-simulated real output device messages from said window server downstream to a downstream module of said input/output stream; and (b.2) said read channel for routing said rerouted simulated input device messages from said write channel, and non-simulated real input device messages from said downstream module, upstream to said window server.

3. The apparatus as set forth in claim 1, wherein, said router is made known of a message organizational structure for identifying a message having such a message organizational structure as a simulated input device message, said message organizational structure being also made known to said interpreter; and said router comprises a code segment for determining whether a message is a simulated input device message based on whether the message was organized in accordance to said message organizational structure, and routing said message in accordance to the result of said determination.

4. The apparatus as set forth in claim 1, wherein, said interpreter comprises:

(a.1) a first code segment for generating said simulated input device messages in accordance to said commands of said first executing program;

(a.2) a second code segment for determining whether a target window of a command is open on a display of said computer system, and opening the target window if the target window is determined to be not open before said first code segments generates a simulated input device message in accordance to said command.

5. The apparatus as set forth in claim 4, wherein, said second code segment comprises code for locating an icon on said display, and generating a simulated cursor control button double click event on the located icon.

6. The apparatus as set forth in claim 4, wherein, said interpreter further comprises:

(a.3) a third code segment for determining whether the target window is partially off said display if the target window is already open, and relocating said target window within said display before said first code segment generates a simulated input event in accordance to the command.

7. The apparatus as set forth in claim 6, wherein, said target window has a pair of base coordinates (x1, y1), and a pair of window dimensions (w1, h1), and said display has a pair of screen dimensions (w0, h0); and said third code segment comprises code for (a.3.1) determining whether (x1+w1) is greater than w0, (a.3.2) determining whether (y1+h1) is greater than h0, (a.3.3) computing an x-direction movement equaling w0−(x1+w1) if (x1+w1) is determined to be greater than w0, (a.3.4) computing an y-direction movement equaling h0−(y1+h1) if (y1+h1) is determined to be greater than h0, (a.3.5) determining whether at least one of the computed x and y direction movements is non-zero, and (a.3.6) generating a simulated cursor control movement event using the computed x and y direction movements, thereby relocating the targeted window such that the target window is within the display.

8. The apparatus as set forth in claim 1, wherein, said computer system further comprises memory and a central processing unit coupled to said input device, for executing said interpreter, said router, said window server, and said first and second executing programs.

9. A method for simulating input events from an input device of a computer system, under the control of a first executing program of said computer system, to a second executing program of said computer system, as if the simulated input events are real input events provided to the second executing program by the input device, said method comprising the steps of:

(a) interpreting commands of said first executing program and generating simulated input device messages from said input device in accordance to said commands being interpreted as if said simulated input device messages are real input device messages generated by said input device; and (b) routing upstream the generated simulated input device messages to a window server which in turn would translate said simulated input device messages into simulated input events and continue to forward upstream the simulated input events to said second executing program, said router being interposed between said window server and said input device in an input/output stream of said computer system connecting said window server to said input device, said router being also used to handle upstream routing to and downstream routing from said window server for non-simulated real input and output device messages being exchanged between said input device and executing programs of said computer system.

10. The method as set forth in claim 9, wherein said step (b) comprises the steps of:

(b.1) rerouting said simulated input device messages from said interpreter through a write channel of said router to a read channel of said router, and routing said non-simulated real output device messages from said window server downstream through said write channel to a downstream stream module; and (b.2) routing said rerouted simulated input device messages from said write channel, and non-simulated real input device messages from a downstream stream module, upstream through said read channel to said window server.

11. The method as set forth in claim 9, wherein said step (b.1) comprises the steps of:
(b.1.1) generating and providing said simulated input device messages from said interpreter to said router in accordance to a message organizational structure made known to said interpreter and router; and
(b.1.2) determining whether a message is a simulated input device message based on whether the message is organized in accordance to said message organizational structure, and routing said message in accordance to the result of said determination.

12. The method as set forth in claim 9, wherein, said step (a) comprises the steps of:
(a.1) prior to generating said simulated input device messages in accordance to commands of said first executing program, determining whether a target window of a command is open on a display of said computer system, and opening the target window on said display if the target window is determined to be not open; and
(a.2) generating said simulated input device messages in accordance to commands of said first executing program.

13. The method as set forth in claim 12, wherein, said step (a.1) comprises locating an icon on said display, and simulating a cursor control button double click event of a cursor control device of said computer system on the located icon.

14. The method as set forth in claim 12, wherein, said step (a.1) further comprises determining whether the target window is partially off said display if the target window is already open, and relocating said target window within said display before generating a simulated input device message in accordance to the command.

15. The method as set forth in claim 14, wherein,
said target window has a pair of base coordinates (x1, y1), and a pair of window dimensions (w1, h1), and said display has a pair of screen dimensions (w0, h0); and
said step (a.3) comprises
(a.3.1) determining whether (x1+w1) is greater than w0,
(a.3.2) determining whether (y1+h1) is greater than h0,
(a.3.3) computing an x-direction movement equaling w0−(x1+w1) if (x1+w1) is determined to be greater than w0,
(a.3.4) compute an y-direction movement equaling h0−(y1+h1) if (y1+h1) is determined to be greater than h0,
(a.3.5) determine whether at least one of the computed x and y direction movements is non-zero, and
(a.3.6) generate a simulated cursor control movement event using the computed x and y direction movements, thereby relocating the targeted window such that the target window is within the display.

16. A method for providing simulation of input events from an input device of a computer system, under the control of a first executing program of the computer system, to a second executing program of the computer system, as if the simulated input events are real input events provided to the second executing program by the input device said method comprising the steps of:

(a) providing an interpreter on said computer system for interpreting commands of said first executing program and generating simulated input device messages from said input device in accordance to said commands being interpreted as if the simulated input device messages are real input device messages generated by the input device; and (b) providing a router on said computer system to be interposed between said window server and said input device in an input/output stream connecting said window server to said input device for routing upstream the generated simulated input device messages to said window server which in turn translates said simulated input device messages into simulated input events and continues to forward upstream the simulated input events to said second executing program, said router being also used to handle upstream routing to and downstream routing from said window server for non-simulated real input and output device messages between said input device and executing programs of said computer system.

17. The method as set forth in claim 16, wherein said step (b) comprises the steps of:
(b.1) providing a write channel to said router for rerouting said simulated input device messages from said interpreter to a read channel of said router, and routing said non-simulated real output device messages from said window server downstream to a downstream stream module; and
(b.2) providing said read channel to said router for routing said rerouted simulated input device messages and non-simulated real input device messages from a downstream stream module upstream to said window server.

18. The method as set forth in claim 16, wherein, said step (a) comprises the steps of:
(a.1) providing a first code segment to said interpreter for generating said simulated input device messages in accordance to commands of said first executing program;
(a.2) providing a second code segment to said interpreter for determining whether a target window of a command is open on a display of said computer system, and opening the target window on said display if the target window is determined to be not open before said first code segment generates a simulated input device message in accordance to the command.

19. The method as set forth in claim 18, wherein, said step (a.2) comprises providing said second code segment with code to locate an icon on said display, and simulate a cursor control button double click event of a cursor control device of said computer system on the located icon.

20. The method as set forth in claim 18, wherein, said step (a) further comprises the step of:
(a.3) providing a third code segment to said interpreter for determining whether a target window of a command is partially off said display, and relocating said target window within said display before said first code segment generates a simulated input device message in accordance with the command.

* * * * *